United States Patent [19]

Victorovich et al.

[11] 4,304,644
[45] Dec. 8, 1981

[54] AUTOCLAVE OXIDATION LEACHING OF SULFIDE MATERIALS CONTAINING COPPER, NICKEL AND/OR COBALT

[75] Inventors: Grigori S. Victorovich, Mississauga; Norman C. Nissen, Oakville, both of Canada; Kohur N. Subramanian, East Hanover, N.J.

[73] Assignee: The International Nickel Company, Inc., New York, N.Y.

[21] Appl. No.: 87,426

[22] Filed: Oct. 22, 1979

[30] Foreign Application Priority Data

Oct. 30, 1978 [CA] Canada .................................. 3141

[51] Int. Cl.³ ..................... C01G 51/00; C01G 53/00; C25C 1/12
[52] U.S. Cl. .................................. 204/108; 423/36; 423/150; 75/119
[58] Field of Search ................... 423/36, 41, 150; 75/109, 117, 119; 204/108

[56] References Cited

U.S. PATENT DOCUMENTS

| | | | |
|---|---|---|---|
| 2,588,265 | 3/1952 | McGauley | 423/37 |
| 2,746,859 | 5/1956 | McGauley | 423/37 |
| 3,174,849 | 3/1965 | Mackiw | 423/41 |
| 3,616,331 | 10/1971 | O'Neill | 204/108 |
| 3,642,435 | 2/1972 | Allen | 423/41 |
| 3,652,265 | 3/1972 | Marschik | 75/117 |
| 3,684,489 | 8/1972 | Emicke | 75/119 |
| 3,741,752 | 6/1973 | Evans | 423/41 |
| 3,744,994 | 7/1973 | Emicke | 75/119 |
| 3,909,248 | 9/1975 | Ryan | 423/150 |
| 3,975,190 | 8/1976 | Van Der Meulen | 423/41 |
| 4,039,406 | 8/1977 | Stanley | 423/36 |

OTHER PUBLICATIONS

Habashi, F., (Ed.) *Progress in Extractive Metallurgy* vol. I, Gordon and Breach, N.Y., (1973) pp. 121–126.
Llanos et al. in *C.I.M. Bulletin*, vol. 67 (1974) pp. 74–81.
*Chemical Abstracts*, vol. 80, (1974) No. 5896h.
Pearce et al. in *Journal of Metals* 12, (1960) pp. 28–32.
*Chemical Abstracts*, vol. 80 (1974) No. 111126s.
Vezina, J. in *CIM Bulletin* (1973) pp. 57–60.
*Chemical Abstracts*, vol. 82, (1975) No. 33654n.
Yu et al. in *Metallurgical Transactions*, vol. 4 (1973) pp. 2137–2144.
Sridhar, R., in *Journal of Metals* (1976) pp. 32–37.
Plaskett et al. "Recovery of Nickel and Copper from High Grade Matte at Impala Platinum by the Sherritt Process", Paper presented at 103rd Annual General Meeting of the AIME, Dallas, Texas, Feb. 24–28 (1974).

*Primary Examiner*—Brian E. Hearn
*Attorney, Agent, or Firm*—Raymond J. Kenny; Miriam W. Leff

[57] ABSTRACT

A process is provided for treating a matte for selective extraction of nonferrous metals using a single stage oxidative pressure leach wherein leaching is carried out in a continuous manner and relatively mild conditions on an aqueous slurry of the matte having a specific sulfur adjustment, having copper present in the aqueous phase, and having a final pH of less than ~4 but not less than ~3.

24 Claims, 3 Drawing Figures

AUTOCLAVE OXIDATION LEACHING OF SULFIDE MATERIALS CONTAINING COPPER, NICKEL AND/OR COBALT

This invention relates to a process for selective extraction of nonferrous metal values from a sulfidic material. More particularly it relates to a hydrometallurgical process for treating copper-nickel-cobalt-iron mattes to selectively extract copper, nickel and cobalt values and to reject iron.

BACKGROUND OF THE INVENTION

Oxidative pressure leaching is a well known technique for extracting nonferrous metal values from sulfidic materials. The technique has been applied to ores, concentrates and mattes. The present process may be used for treating mattes containing only copper and nickel or cobalt, but it is particularly applicable for the treatment of copper-nickel-cobalt-iron mattes.

These mattes are sulfidic intermediate products obtained by pyrometallurgical techniques, e.g. by smelting and converting of various mineral sulfide-containing ores or concentrates. They can also be obtained by processing of oxidic raw materials, for instance, ocean floor nodules containing the nonferrous metals as described by R. Sridhar et al, in the JOURNAL OF METALS, pp. 32-37 (April 1976). They further can be obtained by pyrometallurgical processing of various residues, e.g. residue from carbonylation process, and intermediates, e.g. slags high in Co, Cu and Ni such as finishing converter slags, etc. Some metallurgical intermediates, e.g. those from copper-nickel converter matte separation processes, can be regarded as products similar to mattes. Scrap can also be used as a source for obtaining mattes.

The smelting of the crude ores, nodules, concentrates, or residues and metallurgical intermediates, is primarily carried out to separate the valuable nonferrous metals from the gangue in order to obtain an intermediate product matte more concentrated in the nonferrous metals. The gangue is discarded as a slag. Not all of the iron will be slagged as it is known that iron in the matte would minimize losses of the valuable metals, particularly cobalt, to the slag. The primary product matte is then converted to eliminate the iron as an iron silicate slag.

The final iron content of a cobalt-containing matte after converting is always decided on economic grounds and usually maintained at a level of about 3%. Although higher iron content of the matte could give better cobalt extraction, the 3% iron content level is regarded in most cases as the optimum because higher cobalt extraction at higher iron level may not cover the cost of additional iron removal in subsequent operations of separating and refining the nonferrous metals. This invention, contrary to the conventional operations, provides new possibilities for better cobalt recovery. Since the iron can be removed economically at a later stage, a much higher iron content in the matte can be tolerated and, consequently, cobalt losses to the iron silicate slag can be significantly decreased. In general, mattes containing up to as high as 10-15% of iron and even higher can be processed in accordance with the present invention, thereby providing higher cobalt extraction without excessive expense for iron rejection while separating and refining the nonferrous metals.

The aforementioned ores, concentrates, residues, intermediates, slags, scrap, etc., containing nonferrous metals, as well as iron and possibly precious metals, are usually processed in one way or another with the purpose of extracting the metal values into mattes which, in turn, can be subjected to further treatment according to the present invention. Copper-nickel-cobalt-iron mattes may have a wide composition range. In general, they contain varying amounts of copper, nickel, cobalt, iron and sulfur. In addition they may contain precious metals and some impurities, for example, As, Sb, Pb, etc.

The present invention is not limited either to any specific composition of the matte or to any specific pyrometallurgical technique of producing the same. In general, mattes which can be processed according to the present invention may contain approximately: 20 to 60% copper, up to 15-60% nickel, up to 20-50% cobalt, up to 20-30% iron, up to 20-25% sulfur, provided either nickel or cobalt or both are present.

It is usually assumed that, at high temperatures of pyrometallurgical processes, $Cu_2S$, $Ni_3S_2$, $Co_9S_8$ and FeS are the stable sulfides of the metals thus showing that, in general, mattes are deficient in sulfur to convert all the metals into their sulfates. In fact, mattes are even more sulfur deficient relative to their molar metal contents than it follows from the above sulfide formulae. Usually when such mattes are cooled, metallic particles are precipitated in addition to crystallized sulfides.

The term "selectivity" as applied to metallurgical technology has been used to signify that at least one chemical element is separated from at least another one or from the bulk of the material. For example, iron is separated from the nonferrous metals into an iron silicate slag in the course of converting, or copper is separated from nickel and/or cobalt by one way or another, etc.

Many methods of oxidative pressure leaching of sulfidic materials containing copper, nickel, cobalt and iron are known for dissolving the nonferrous metals under oxygen pressure in acidic or ammoniacal aqueous media. Processes of this type are described in U.S. Pat. Nos. 2,746,859; 3,174,849; 3,642,435; 3,975,190, and in an article by R. F. Pearce et al in the JOURNAL OF METALS, January 1960, pp. 28-32, etc. Some of these processes may provide selective dissolution of all the nonferrous metals from iron and precious metals, but in general, they do not separate the nonferrous metals themselves. A significant economic advantage, however, may be achieved if in the course of oxidative pressure leaching itself the separation of copper from nickel and/or cobalt is realized.

In recent years processes using selective leaching to separate copper from nickel and/or cobalt have been reported. Among the processes of this type are the process presented by R. P. Plasket et al at the 103rd Annual Meeting of the AIME, Dallas, Tex., Feb. 24-28, 1974 and a process described by I. N. Maslenitsky et al in PROGRESS IN EXTRACTIVE METALLURGY, Vol. I, pp. 121-126, 1973. Both these processes require at least two oxidative pressure leach stages. In the Plasket et al process both stages of oxidative pressure leach are carried out under highly corrosive conditions of relatively low pH and temperature above 130° C. Thereafter two additional operations are required for the removal of copper and iron. In the latter process, in addition to the shortcoming of two stage autoclave leaching, this process requires a commercially unacceptable critical limitation to 10-20 minutes in the first stage leach, otherwise the copper content of the nickel-cobalt solution becomes unacceptably high and the whole process, consisting of the two mutually interdependent stages, becomes inoperable and impossible to control.

A process for selective recovery of nickel from a nickel-copper matte consisting essentially of nickel, copper, sulfur and minor amounts of iron and precious metals—with only one stage of oxidative pressure leaching—is described in U.S. Pat. No. 3,652,265. After adjusting the sulfur content of a matte water slurry with elemental sulfur to obtain the nickel to sulfur molar ratio of 1:1, the sulfur adjusted slurry is subjected to the oxidative pressure leach, typically, at the temperature of 165°–180° C. under oxygen partial pressure of about 7–10 kg/cm$^2$ for 10–22 hours, to convert all the sulfur and the metallic values to sulfate and oxyhydrates, respectively. The overall process requires a long time and relatively high temperatures for the oxidative leach, and the leach itself does not result in sufficient separation of nickel and copper. To achieve the desired nickel recovery and copper to nickel ratio in the residue, lengthy equilibration steps are needed.

The treatment of matte containing 40.0% Ni, 39.5% Cu, 16.4% S and 0.2% Fe is reported by Z. R. Llanos et al in CIM Bulletin, pp. 74–81 (February 1974). In this process the matte is first subjected to an aerated atmospheric leach with recycle electrolyte from the copper tank house, and the leach residue is then subjected to autoclave oxidative leaches followed by atmospheric digestion of the obtained slurries with $H_2SO_4$ additions resulting in the feed solution for copper electrowinning. The overall process has a number of disadvantages, of which the most important ones are: low direct extraction (~50%) of nickel into the nickel pregnant solution and recirculation of the residual nickel through the cooper electrowinning operation; large recycle of the copper from electrowinning through the nickel atmospheric leaching and further through the autoclave leaching and atmospheric digestion where the recycled copper is firstly precipitated and then dissolved all over again; and complexity of the overall process. Also, this process is reported to require high temperature and total pressure, viz. 180°–200° C. and 42 kg/cm$^2$ in the autoclaves.

It is an object of the present invention to treat copper-nickel-cobalt-iron mattes to extract selectively the nonferrous metal values. It is another object to achieve such selective extraction using only one stage of oxidative pressure leaching. It is a further object to provide an overall economically feasible process for obtaining a higher degree of extraction efficiency for nickel and, especially, for cobalt values. Still another object is to isolate nickel and cobalt values in a solution which is essentially free of iron, thereby eliminating the requirement for a separate iron removal step. An additional object is to provide a process for nickel and cobalt isolation into a solution which is essentially free of copper and iron without using any external reagents. A further object is to provide a method for separating copper into an oxidative pressure leach residue from which it can be conveniently and rapidly solubilized in industrially and economically suitable solvents at ambient conditions. Another object is to minimize nickel and cobalt content of the copper-bearing residue and, thereby, minimizing recirculation of nickel and cobalt through copper-extracting operations. A further object is to eliminate copper recycling through nickel and cobalt-extracting operations and multiple precipitation and subsequent dissolution of the copper. An additional object is to provide an oxidative pressure leach process for the extraction of nonferrous metal values in which the pH level in the autoclave is not lower than 3.0-3.5 and the temperature is not higher than 130° C., thereby enabling the use of much less expensive equipment. And a further object is to provide a simple and operable process with a minimum of operational steps and maximum operational stability.

These and other objects are accomplished in the process of the present invention as will be appreciated by reference to the description and examples given below and to the accompanying drawings.

SUMMARY OF THE INVENTION

Figure 1:
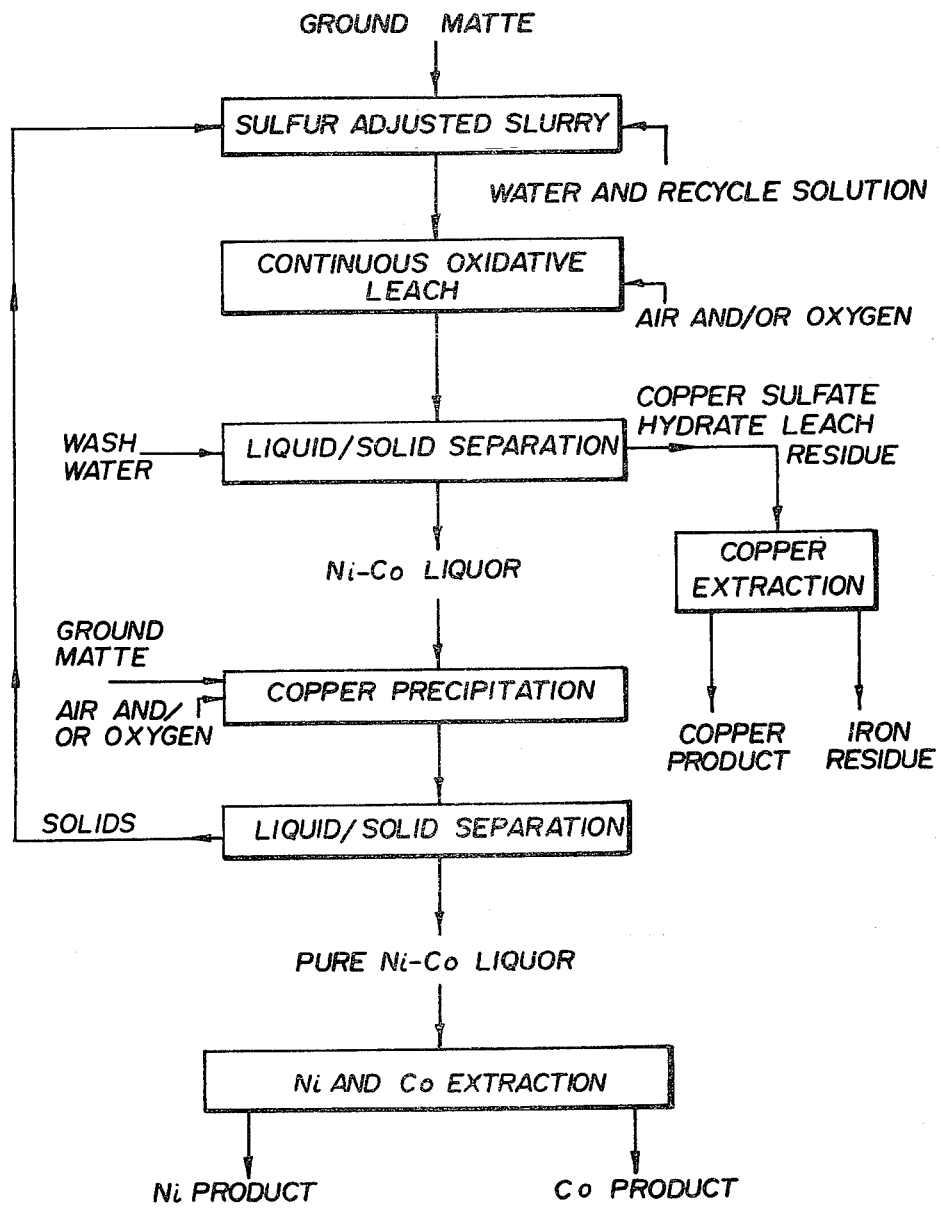
FIG. 1 is a schematic flow diagram illustrating the steps in a preferred embodiment of the process of the present invention.

In accordance with the present invention a process is provided for treating a finely ground matte containing copper and sulfur values and at least one of the metal values nickel and cobalt, and which may also contain iron values, said process including a single stage oxidative pressure leach to effect selective extraction of nickel and/or cobalt from copper and iron values, comprising: forming an aqueous slurry comprising ground matte, said slurry having a sulfur content, apart from elemental sulfur, substantially equivalent on a molar basis to the nickel and cobalt plus about 35% to about 70% of the copper in said slurry; subjecting said aqueous slurry to the single stage aqueous oxidative leach in a continuous manner in the presence of copper in the aqueous phase of the slurry for a period of time necessary to convert substantially all of the sulfidic sulfur in the slurry to the sulfate form, and allowing the pH of the slurry to drop to a level of below about 4 but not below about 3; and thereby obtaining a substantially iron-free leach solution containing a preponderant amount of the nickel and cobalt values and a copper sulfate hydrate containing leach residue containing a preponderant amount of the copper values and substantially all the iron values.

The oxidative pressure leach solution can be separated from the residue and the solution and residue treated to recover the nickel, cobalt, and copper. If precious metals are present they will report to the residue and can be recovered therefrom.

Under the oxidative leach conditions of the present invention, substantially all sulfidic sulfur is oxidized into sulfate form and a preponderant amount of nickel and cobalt transfer into a substantially iron-free sulfate solution while only a controlled amount of copper reports to the solution. The main part of the copper hydrolyzes and forms the copper sulfate hydrate solid residue which also contains practically all the iron of the matte as well as the controlled amount of nickel and cobalt.

It is a specific feature of the invention that the sulfur content of the slurry is sufficient, on a molar basis, to combine all of the nickel and cobalt values into sulfates, plus only about 35 to 70% of the sulfur necessary to form copper sulfate, while no sulfur is allowed for the iron. If sulfur addition is required, elemental sulfur is not employed for the adjustment.

It is another feature of the invention that during the oxidative pressure leaching at least about 0.5 g/l of copper must be present in the liquid phase of the slurry with nickel and cobalt, and preferably at least 1 up to about 5 g/l of copper are present, since it was discovered that both the oxidation process and the nickel-cobalt dissolution are greatly catalyzed when the above copper concentration is maintained in the leach liquor.

Another specific feature of this invention is that the slurry of finely ground matte is subjected to the oxidative pressure leach in a continuous manner. Unexpectedly, it was found that the oxidation process for the sulfur-deficient slurry of this invention proceeds more rapidly at relatively low temperatures compared to the rate in batch operations. The lower temperature oxidation has the added advantage of being more selective because higher temperature oxidation enhances hydrolysis of nickel and cobalt.

According to a preferred embodiment of the process the copper in the leach liquor of the oxidative pressure leaching step can be precipitated to a very low level by vigorous agitation of the liquor with, at least, part of the ground matte under oxidizing conditions, e.g., in the presence of air and/or oxygen, at a moderately elevated temperature, e.g. at about 60° to 85° C., and atmospheric pressure. After the liquid/solid separation, the pure nickel-cobalt liquor is obtained with (Ni+Co) to Cu and (Ni+Co) to Fe ratios of, at least, 10,000 in either case. The resultant solids product, enriched with respect to copper, may then be cycled back to the autoclave oxidative leach.

In a still further aspect of the preferred embodiment of the invention, the copper sulfate hydrate leach residue is treated in a copper-containing acid solution at a controlled pH of about 2.0 to about 2.8, preferably about 2.2 to about 2.5, and a temperature below the boiling point, preferably at about 50° C. to about 80° C., to solubilize selectively nonferrous metals and separate them from the undissolved iron contained in said residue. Copper is extracted from the resultant solution by an electrowinning technique and a preponderant amount of the spent electrolyte is recirculated to the aforesaid treatment of the above residue, while a minor amount of the spent electrolyte is used to make up the oxidative leach slurry to adjust the sulfur content of the slurry and recover nickel and cobalt contained in the residue. A preponderant amount means roughly greater than 50%.

DESCRIPTION OF PREFERRED EMBODIMENT

It will be noted that the accompanying schematic flow diagram shows steps carried out in a preferred embodiment of this invention. Referring to the diagram, the process is carried out as follows:

Ground Feed

A matte containing copper, nickel, cobalt and iron is ground to a size not larger than about −200 mesh. Preferably it is ground to −325 mesh and slurried in water. When all the ground matte is used first for the copper precipitation step, the residue after separation of the pure nickel-cobalt liquor is slurried to make up the feed to the leach. In general, the solids, i.e. finely ground matte and/or residue, after the copper precipitation step are dispersed in water to give a liquid:solid ratio of about 10:1 to 3:1, and the sulfur level is adjusted as required.

Sulfur Adjustment

The sulfur content of the slurry is calculated to provide sufficient sulfur to convert all of the nickel and cobalt values into normal sulfates, plus only from 35 to 70% of the sulfur necessary to form normal copper sulfate. No sulfur is allowed for the iron, assuming that it forms insoluble compounds containing no sulfur. Thus, the sulfur content of the slurry is adjusted so that it contains sulfur equivalent, on a molar basis, to all of the nickel and cobalt, and from 35% to 70% of all the copper in the slurry. In other words, only from 0.35 to 0.70 gram atoms of sulfur per gram atom of copper is allowed, and the whole slurry remains sulfur-deficient in terms of overall sulfur content necessary to form normal sulfates of all the nonferrous metals present in the slurry.

The amount of sulfur allowed for the total copper content of the slurry is a very specific and critical parameter of the process. Maintaining the sulfur content within the range of about 35% to about 70%, all other things being equal, enables control of the nonferrous metals distribution within desirable limits, whereas outside of this range either too much copper goes into the nickel-cobalt liquor or too much nickel and cobalt co-precipitate with the copper sulfate hydrate residue. In addition, the oxidation process slows down sharply.

Usually the sulfur level of the matte is less than that desired for the process. Therefore, the slurry sulfur content is suitably adjusted upwards. This adjustment may be made, for example, by the addition of $H_2SO_4$, $CuSO_4$, $FeSO_4$, $Fe_2(SO_4)_3$, FeS, matte of lower grade (higher FeS content), spent copper electrowinning electrolyte, etc., to the slurry or even directly into the autoclave. Elemental sulfur, however, may not be used because, at relatively mild conditions of temperature and oxygen partial pressure being recommended by the present invention, it cannot be oxidized into sulfate form needed to dissolve nickel and cobalt and form copper sulfate hydrate leach residue. If the sulfur content of the matte is higher than required, then the adjustment may be made downwards by addition of such oxidic compounds of nickel, cobalt or copper as hydroxides and/or oxides, or by using copper metallics, $Ni_3S_2$, etc. Some of these additives can easily be obtained from solutions being produced according to the present invention. For example, copper powder can be precipitated by electrowinning whereas nickel and/or cobalt hydroxides as well as copper hydroxide can be precipitated by neutralization of some part of the nickel-cobalt liquor or copper electrolyte, etc.

Oxidative Leach

The oxidative leach of the present process is a single stage route to obtaining selective and efficient extraction of nickel and cobalt values, requiring—in addition to the sulfur adjustment described above—a continuous mode of operation, the presence of free oxygen, and copper in the liquid phase of the slurry. Preferably the reaction is carried out at a relatively mild temperature.

Thus, for example, after dispersing finely ground matte and/or the solids obtained from the copper precipitation step to give a suitable liquid:solid ratio and adjusting the sulfur level, the slurry is treated in a continuous manner in a conventional horizontal autoclave having several compartments, or in a train of vertical autoclaves, at a temperature preferably in the range of about 110° C. up to about 130° C. under an oxygen partial pressure of at least about 0.25 MPa, preferably about 0.5 to about 1.5 MPa, in the presence of free $O_2$, e.g. pure $O_2$ or air or both. Oxidation proceeds too slowly below 110° C. unless an excessively high oxygen partial pressure is used. It also slows down drastically at oxygen partial pressures below about 0.25 MPa, even at temperatures above 110° C. Although at higher temperatures than 130° C., e.g. 150° C., the reaction proceeds faster, 130° C. is recommended as the upper level for achieving better selectivity.

A further requirement of the oxidative leach step is to maintain copper in the aqueous phase of the slurry, otherwise the leach proceeds extremely slowly to the point of being impractical. The level of copper is preferably at least 0.5 g/l, and more preferably, at least about 1 up to about 5 g/l. The presence of copper in the aqueous phase is particularly important in the initial compartment of a multi-step autoclave continuous system. The effects of the concentrations of sulfur and copper on the leaching rate, especially in the initial stage of the oxidation are illustrated in Example 4. In practice, there are many ways of maintaining the copper concentration in the leach solution at the desirable level of at least about 0.5 to about 5.0 g/l. One of them is to provide an appropriate combination of all the operational parameters according to this invention, especially the slurry adjusted sulfur content, the temperature and oxygen partial pressure, and the duration of the leach. Another one consists in using a copper containing solution, e.g. copper spent electrolyte, for feed make up. A recycle of a small part of the final leached slurry to the initial stage may also be feasible. An adjustment of a residence time, all other things being equal, can be another way. An increase of the temperature within reasonable limits helps maintain the desirable copper level as well, and so on.

It will be appreciated that the reaction conditions during the oxidative leach step are interrelated and also that variations in the feed will affect the results. In general, however, when the oxidative leach is carried out at a temperature in the range of about 110° C. to about 130° C. under an oxygen partial pressure in the range of about 0.5 MPa to about 1.5 MPa and at a sulfur to copper level of about 40–60 mole %, based on total copper, while maintaining at least about 1.0 to 5.0 g/l of copper in the solution from the very beginning of the process, then substantially complete oxidation is effected in about 2 to 6 hours.

The autoclave oxidative leach produces a liquor containing about 90% to about 98% of the nickel and/or cobalt values and less than 1% of the iron in the matte. This Ni-Co liquor usually contains at least about 5–10 g/l copper, more often, about 10–25 g/l copper, and from about 50–70 g/l to about 80–120 g/l of nickel and/or cobalt, and has a pH of about 3.3 to 3.8.

The Ni-Co leach liquor is separated from the copper sulfate hydrate leach residue using any suitable known technique. The liquor contains a preponderant amount of the nickel and cobalt values and the residue contains most of the copper value of a matte and practically all the iron as well as precious metals, if any are present.

In general the Cu:Ni ratio in the leach residue is about 10:1 to 20:1 while the (Ni+Co)/Cu ratio in the leach liquor is about 4:1 to 10:1.

Following liquid:solid separation step, the Ni-Co liquor and the residue can be further processed in various ways using known techniques to obtain individual products of the metals. For example, the liquor is treated for extraction of the nickel and/or cobalt and the leach residue for copper recovery.

Copper Precipitation

A typical liquor from the autoclave leach may analyze about 80–100 grams per liter nickel plus cobalt, about 10 to about 25 grams per liter copper and less than 0.05 gram per liter iron. Before processing the liquor for nickel and/or cobalt recovery, the copper content must be lowered to a required level, e.g. to about 0.01 g/l.

This can be achieved by a number of known techniques, e.g. by cementation, by solvent extraction, by hydrolysis, etc. In accordance with a preferred embodiment of this invention, the copper in the leach liquor is precipitated to a very low level by vigorous agitation of the liquor with the ground matte under oxidizing conditions of air and/or oxygen at a moderately elevated temperature of about 60° to about 85° C., e.g. at about 70° C., and normal pressure for about 2–4 hours. The copper level is thereby lowered as illustrated in Example 6.

Copper extraction from the matte into the Ni-Co liquor depends on the copper content of the former as well as on a particular way of maintaining the copper concentration in the leach solution. For instance, when the copper concentration in the leach solution is maintained by a recycle of the leached slurry or by using the copper electrowinning spent electrolyte, then the extraction may be considered as equal to zero when the Ni-Co liquor contains no more copper than what has been recycled. If no copper is recycled to the feed slurry of a ground matte, then its recovery from the matte into the liquor may be from about 10% up to about 30% depending on copper content of the matte and the desired copper concentration in the liquor.

Nickel and Cobalt Extraction

After the copper content of the Ni-Co liquor is lowered, the nickel and/or cobalt can then be recovered from the liquor by any number of conventional methods. Precipitation of cobalt after oxidation with chlorine is one method. Separation of cobalt by solvent extraction with D2EHP is another. Nickel can be recovered from the "cobalt-free" liquor by precipitation, electrowinning, etc.

Copper Extraction

In general, the composition of the copper sulfate hydrate leach residue, particularly its iron content, may vary depending on the feed composition, whereas the Cu:Ni and/or Cu:Co ratios in the residues are mainly dependent on the operational parameters of the oxidative leach, primarily, on the temperature and the copper concentration of the Ni-Co leach liquor, the latter being dependent at least in part on the sulfur deficiency of the feed slurry. The residue most often analyzes about 35–45% Cu, about 5–15% Fe, about 7–10% S and about 3–6% Ni+Co. From about 70% to about 90% of the residue is represented by copper sulfate hydrate, $Cu_3(SO_4)(OH)_4$ or $3CuO.SO_3.2H_2O$, with the nickel and/or cobalt present as isomorphous constituents.

A selective copper recovery from this residue can be accomplished by various hydrometallurgical techniques using acid sulfate or ammoniacal aqueous media. Copper sulfate hydrate has been found to readily and selectively solubilize in both media, as shown in Example 7.

When ammoniacal aqueous media are used for treating the copper sulfate hydrate leach residue, the copper recovery from the ammoniacal solutions can be effected, for instance, by hydrogen reduction. The nickel and cobalt values of the solutions can be recovered after the copper reduction by a number of methods, e.g. by distillation of the free ammonia followed by an acidification (neutralization) in order to precipitate nickel and/or cobalt salts which, in turn, can be combined with the main stream of nickel and cobalt in the Ni-Co liquor, before or after the copper precipitation step shown in FIG. 1, thereby providing about 99% extraction of all the nickel and cobalt values of the matte into the pure Ni-Co liquor.

In accordance with the preferred embodiment of this invention, however, the copper sulfate hydrate leach residue is treated in a copper-containing acid solution at a controlled pH of about 2.0 to about 2.8, preferably, 2.2 to 2.5 and at a temperature below the boiling point, preferably at about 50° C. to about 80° C. to selectively solubilize copper as well as nickel and/or cobalt contained in the residue. Copper is extracted from the resultant solution by an electrowinning technique. WHile not shown in the flow sheet, a preponderant amount of the spent electrolyte from the copper electrowinning step may be recirculated to the treatment of the leach residue, and a minor amount of the spent electrolyte, proportional to the nickel and cobalt values of the above residue, is used to make up the autoclave oxidative leach feed slurry for recovering the above nickel and cobalt values as well as for possible adjustment of the sulfur level of the slurry and maintaining the copper concentration in the solution during the autoclave leach as described earlier.

The following examples are given by way of illustration and to enable one skilled in the art to have a better understanding of the invention. In the examples the percent sulfur relative to Cu content in the pressure leach step is on a molar basis. All other percentages are weight percent, unless otherwise specified.

A comparison of a batch and a continuous operation is shown in Example 1.

EXAMPLE 1

A matte was ground to 100% −325 mesh and had the following composition (%):

| Cu | Ni | Co | Fe | S |
|---|---|---|---|---|
| 26.8–27.4 | 40.3–41.2 | 5.09–5.26 | 5.33–5.48 | 20.1–20.8 |

A slurry of the matte in water was prepared with an overall sulfur content to be equivalent to all of the nickel and cobalt plus 45-50% of all the copper, on a molar basis. The slurry sulfur content was adjusted using sulfuric acid and its concentration in the aqueous phase of the slurry was 60–70 g/l. The slurry was then treated under 1 MPa oxygen partial pressure during 2.5-2.8 hour residence time in both continuous and batch mode of operation. When continuous type of operation was employed, the slurry was allowed to flow through a four compartment autoclave while the batch operation was carried out in a conventional single compartment vessel. Results obtained after the oxidative treatment and a solid:liquid separation are shown in TABLE I.

TABLE I

| Temp. °C. | $S^{2-}$ to $SO_4^{2-}$ w/o | Leach Residue w/o by Matte | Extraction into Solution, w/o | | | | pH of Solution |
|---|---|---|---|---|---|---|---|
| | | | Cu | Ni | Co | Fe | |
| Batch Operation | | | | | | | |
| 110 | 3.9 | 103.4* | 0.03 | 36.2 | 23.1 | 0.004 | 6.0 |
| 130 | 4.4 | 104.3* | 0.06 | 36.4 | 22.6 | 0.02 | 5.7 |
| 170 | 99.5 | 56.2 | 35.0 | 91.3 | 91.6 | 0.02 | 3.7 |

TABLE I-continued

| Temp. °C. | $S^{2-}$ to $SO_4^{2-}$ w/o | Leach Residue w/o by Matte | Extraction into Solution, w/o | | | | pH of Solution |
|---|---|---|---|---|---|---|---|
| | | | Cu | Ni | Co | Fe | |
| Continuous Operation | | | | | | | |
| 110 | 96.7 | 64.4 | 27.3 | 95.5 | 94.8 | 0.24 | 3.4 |

*It appears that residue has picked up Ni and/or Co sulfates, possibly as complex sulfate hydrate phase, which accounts for a weight % (w/o) of greater than 100%.

The corresponding leach residues after the treatment were of the following composition (%):

| Temp., °C. | Cu | Ni | Co | Fe | $S_{total}$ | $S_{as\ SO_4}$ |
|---|---|---|---|---|---|---|
| Batch Operation | | | | | | |
| 110 | 25.2 | 25.1 | 3.83 | 5.30 | 21.9 | 2.56 |
| 130 | 24.5 | 24.3 | 3.73 | 5.25 | 21.9 | 2.83 |
| 170 | 33.2 | 6.73 | 0.88 | 9.75 | 7.93 | 7.74 |
| Continuous Operation | | | | | | |
| 110 | 39.8 | 3.18 | 0.48 | 8.28 | 9.05 | 7.7 |

Results in TABLE I show that when a batch operation is employed, the oxidation of sulfidic sulfur to sulfate is very slow even at 130° C. Because of this only small amounts of nickel and cobalt are extracted, mainly due to the presence of $H_2SO_4$ in the initial slurry. Contrastingly, the continuous mode of operation, all other things being equal, provided virtually complete oxidation of the sulfidic sulfur into sulfate at 110° C. and better nickel and cobalt extraction compared to the batch operation at 170° C.

The nickel-cobalt liquor after the continuous leaching at 110° C. contains 81.5 g/l Ni, 10.5 g/l Co, 0.024 g/l Fe and 18.0 g/l Cu. As shown in Example 6, this copper can be removed without any problem from the liquor in the copper precipitation step giving pure nickel-cobalt liquor containing less than 0.01 g/l of both copper and iron. It is also significant that the leach residue after continuous operation at 110° C. has Cu:Ni and Cu:Co ratios as high as 12.5 and 82.9 respectively, compared to only 4.9 and 37.7 for the batch operation at 170° C.

With reference to the continuous mode of operation, temperatures in range of about 110° C. to about 150°-170° C. provide a significant increase in rate of oxidation and dissolution as well as copper sulfate hydrate formation. However, the temperature is preferably maintained at less than 130° C. so as to minimize the coprecipitation of nickel and cobalt with copper. This is illustrated in Example 2.

EXAMPLE 2

The matte of the same grind and composition as in Example 1 was slurried in water with an addition of $H_2SO_4$ to give an overall sulfur content equivalent to all of the nickel and cobalt plus about 60-65 mole % of all the copper. The slurry was then leached under 1 MPa oxygen partial pressure for about 2.5 hours at temperatures in the range of 110°-170° C., and the final leach residues and liquors were analyzed after liquid:solid separation. It was found that the conversion of $S^{2-}$ into $SO_4^{2-}$ was better than 95% and the iron extraction into solution was less than 0.5%. The distributions of valuable metals between the liquors and the copper sulfate hydrate residues as a function of temperature are shown in FIGS. 2 and 3.

Figure 3:
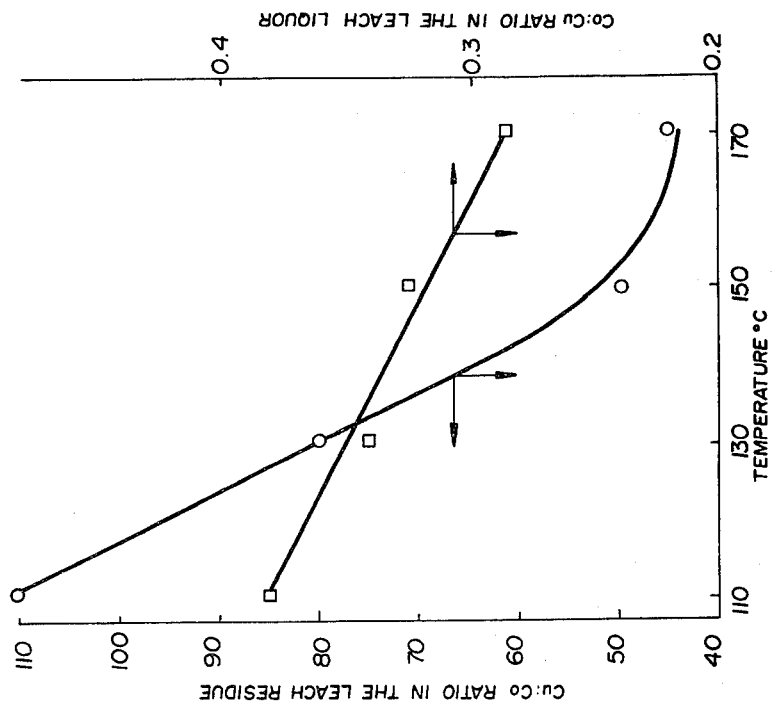
FIG. 3 is a graph showing the distribution of Co and Cu between the leach liquors and residues.
Figure 2:
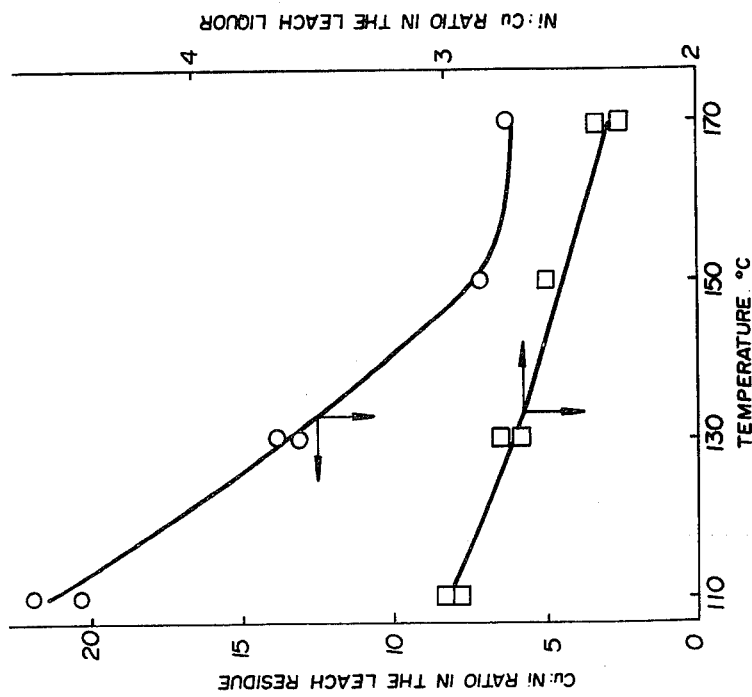
FIG. 2 is a graph showing the distribution of Ni and Cu between the leach liquors and residues.

Data of FIGS. 2 and 3 show that the distribution of the metals is very strongly affected by the temperature, and the lower temperature provides a sharp improvement in the metals separation, especially, in lowering nickel and cobalt being coprecipitated with copper into the residues.

As indicated above, it has now been found that, at constant temperature, the separation of the metals also depends on the degree of sulfur deficiency of the slurry with respect to its copper content. This important feature can be illustrated by a comparison of the data obtained in a continuous operation at 110° C. for the above Example 1 with those of the Example 2 for the same temperature as follows: At a sulfur level equivalent to 45-50% of the copper, as in the Example 1, the Ni:Cu and Co:Cu ratios of the leach liquor are 4.53 and 0.58, respectively, whereas Cu:Ni and Cu:Co ratios of the leach residue are 12.5 and 82.9. At 60-65% sulfur for all the copper, as in the Example 2, the Ni:Cu and Co:Cu ratios of the leach liquor are about 3.0 and 0.38, respectively, but Cu:Ni and Cu:Co ratios of the residue are about 21.0 and 110 as shown in FIGS. 2 and 3.

The effect of the sulfur content of the slurry on the distribution of nonferrous metals in the solution and residue is illustrated in the following Example 3.

EXAMPLE 3

A matte having the same composition as in Example 1 was slurried with water and a copper spent electrolyte. The total sulfur content of the slurry was adjusted with sulfuric acid. The liquid phase of the slurry initially contained 14 g/l Cu, 7 g/l Ni, 1 g/l Co and from 42 to 110 g/l $H_2SO_4$. The slurry with liquid to solid ratio of 5:1 was continuously leached under 1 MPa oxygen partial pressure at a temperature of 110° C. with a residence time of about 2.5-2.8 hours. Results are tabulated in TABLE II.

TABLE II

| Sulfur for $CuSO_4$ Formation, Mole % | Extraction into Leach Residue, Wt. % | | | | Cu:Ni in Residue | Cu:Co in Residue | Conversion $S^{2-} \rightarrow SO_4^{2-}$ Wt. % | pH of Ni—Co Liquor |
|---|---|---|---|---|---|---|---|---|
| | Cu | Ni | Co | Fe | | | | |
| 30 | 93.5 | 29.5 | 25.8 | 99.97 | 2.54 | 21.7 | 65 | 4.2 |
| 35 | 91.2 | 10.9 | 11.3 | 99.96 | 6.55 | 48.5 | 92 | 3.9 |
| 50 | 72.9 | 4.6 | 5.0 | 99.80 | 12.6 | 83.0 | 96 | 3.4 |
| 65 | 64.7 | 4.0 | 5.7 | 98.98 | 16.7 | 92.4 | — | 3.1 |
| 105 | 14.8 | 0.2 | 1.0 | 92.7 | 63.0 | — | 98 | 1.9 |

These results include that outside of the recommended sulfur range the distribution of metals in the leach solution and residue is not acceptable. A copper sulfate hydrate leach residue with a preponderant amount of the copper value and substantially all of the iron along with only minor amounts of the nickel and cobalt is obtained when the sulfur for copper level is maintained in accordance with the present invention, i.e. about 35 to about 70 mole %. The above data also show preferred pH level to be maintained at the end of the oxidative leach to achieve the objectives of the process is below about 4 and above about 3.

The effects of sulfur level and copper concentration in the initial stages of the oxidative leach are illustrated in Example 4.

EXAMPLE 4

All the conditions of leaching were the same as in Example 3 with the exception that the slurry samples were taken out of the first compartment of the four compartment autoclave used. In other words the residence time of the slurry under leaching conditions was approximately ¼ of the residence time shown in Example 3. An analyses of the samples gave results shown in TABLE III.

TABLE III

| Sulfur for $CuSO_4$ Formation, Mole % | Concentration in Leach Solution, g/l | | | pH of Solution | $S^{2-} \rightarrow SO_4^{2-}$ Conversion, Wt. % | Leach Residue, % by Weight of Matte |
|---|---|---|---|---|---|---|
| | Cu | Ni | Co | | | |
| 30 | 0.08 | 37.5 | 5.0 | 5.25 | 7.1 | 122 |
| 35 | 2.40 | 55.5 | 8.10 | 4.60 | 37.8 | 117 |
| 50 | 6.20 | 72.5 | 9.70 | 4.05 | 59.5 | 82.3 |
| 65 | 14.0 | 78.0 | 10.7 | 3.50 | 65.9 | 63.4 |

The data in TABLE III show that in the initial stages of the oxidation process, the pH tends to rise noticeably, especially when a lower sulfur for copper level is employed. It has been found that when the pH rises to a level above about 5.0-5.3 the oxidation slows down considerably. In order to make the leach progress rapidly, the pH at the beginning of the leach must not be allowed to rise over about 5.0 and, as the leach progresses, the pH must gradually drop to a level of below about 5, but not below of about 3.

In accordance with the present invention, the oxidation is greatly enhanced when some amount of copper is present in the solution during the autoclave leaching, especially in the beginning of the latter. A mechanism for this phenomenon has not been established yet but it was repeatedly observed that when a few g/l of copper was available, in the liquid phase of the slurry under the operational parameters, the oxidation process accelerated sharply and the pH never rose above about 5.0 as illustrated in TABLE III.

A comparison of the data in TABLE III with that in TABLE II shows the positive role the presence of copper in the solutions plays in achieving the desirable final results, in terms of the sulfur conversion and nonferrous metals separation between the residue and the nickel-cobalt liquor.

It can be concluded from the above description and examples that the rate of conversion of sulfides into sulfates, that is the rate of oxidation, will depend on the leaching conditions, increasing with an increase in temperature, with an increase in the sulfur for copper level in the leach slurry and with an increase in the copper concentration in the leach solution. It will be appreciated from Example 5 that the oxidation rate is also dependent on the oxygen partial pressure.

EXAMPLE 5

The matte of the same grind and composition as in Example 1 was slurried in water and the slurry was placed in a single compartment autoclave and heated up to a temperature of 110° C. Various oxygen partial pressures within the limit of 2.0 MPa were used. A sulfuric acid addition of 38% by weight of matte was employed so that the total sulfur content in the slurry corresponded to the stoichiometric amount necessary for complete formation of nickel and cobalt sulfates, plus about 65 mole % for copper sulfate. The overall liquid:solid ratio was 4:1. Samples of the slurry were withdrawn from the autoclave at various intervals of time and analyzed as required.

A specific feature of these leaches was that the sulfuric acid addition was made directly into the autoclave already containing the water slurry under the given oxygen partial pressure, in order to closely approach the conditions of a continuous leach as well as to be able to exactly determine the residence time. Practically no oxidation had taken place before the sulfur adjustment was made by the addition of sulfuric acid.

For oxygen partial pressure of 2, 1 and 0.5 MPa the oxidative process came to completion in 2, 3 and 4 hours, respectively. Final extractions of nickel, cobalt and copper into solution were 98, 98 and 40–46% respectively in each of the above leaches. Final liquors contained about 120 g/l of nickel plus cobalt and nearly 30 g/l copper and had a pH of about 3.5. Cu:Ni ratios in all the residues were as high as about 18 with the nickel and cobalt contents of 2.0–2.2 and 0.32–0.34%, respectively.

These leaches show that progressively shorter residence time is required as the oxygen pressure is increased, and higher oxygen pressure provides higher copper concentration in the leach solution at the very beginning of the leach even though its final concentrations depends only on the sulfur deficiency of the slurry and the temperature, provided all other conditions are the same. Because of this specific role of oxygen, relatively higher oxygen pressure may be used when the lower sulfur for copper level is desired. Relatively lower oxygen partial pressure may be employed when the above specified copper concentration is maintained in the leach liquor by some other means, e.g. by small recycle of the leached slurry, or when the higher sulfur for copper level is used, as in this example.

A preferred method of lowering the copper content of the liquor from the autoclave leach, in accordance with the present invention, is illustrated in Example 6.

EXAMPLE 6

A sample of ground matte (M) and the liquors (L) accumulated after various leaches had the following compositions (% and g/l, respectfully):

|   | Cu | Ni | Co | Fe | S |
|---|---|---|---|---|---|
| M | 24.6–28.0 | 40.9–42.1 | 4.82–5.44 | 4.07–5.02 | 19.1–19.5 |
| L | 13.4–40.0 | 86.0 | 11.4 | 0.003 | — | pH of the liquors was above 3.2.

Slurries of 200 g/l of the matte in the liquors with various copper concentrations were vigorously agitated at a temperature of about 70° C. with air purging at a rate of about 1 liter per minute per liter of the slurry. The slurry pH was continuously monitored and samples were periodically withdrawn to analyze solid and liquid phases. The copper was found to precipitate very readily and nickel, cobalt and iron concentrations as well as pH of the liquors appeared to rise as the treatment progressed. In order to retain the liquors at low iron concentration, the pH must be allowed to rise up to a level of, at least 5.0, preferably, at least 5.2. Results of the tests are shown in TABLE IV.

The data in TABLE IV show that as the initial copper concentration of the liquor increases from 13.4 to 40.0 g/l, a progressively longer time is required to reach the pH level necessary to keep the iron concentration at desirably low levels. The purified Ni-Co liquor contains from 0.5 to about 30 mg/l copper that corresponds to (Ni+Co):Cu ratios in the pure liquor from $21.10^4$ to $0.46.10^4$, but at 25 g/l initial copper concentration the pure Ni-Co liquor still has a (Ni+Co):Cu ratio as high as $9.3.10^4$ compared to $21.10^4$ when the initial copper concentration was 13.4 g/l. This indicates there is quite a wide range of initial copper concentration in the nickel-cobalt leach liquor within which the copper can be readily precipitated without use of any external reagents to obtain the pure nickel-cobalt liquor with (Ni+Co):Cu and (Ni+CO):Fe ratios of about 100,000 and 50,000, respectively.

TABLE IV

| Initial Cu Conc. g/l | Time pH = 5.2 min. | Analysis at pH = 5.2 | | | | | | | | % Solids/ Wt. Matte |
|---|---|---|---|---|---|---|---|---|---|---|
| | | Liquor, g/l | | | | Solids, w/o | | | | |
| | | Cu | Ni | Co | Fe | Cu | Ni | Co | Fe | |
| 13.4 | 120 | 0.0005 | 93.5 | 13.3 | 0.002 | 31.5 | 35.2 | 3.77 | 4.48 | 101.3 |
| 20.0 | 150 | 0.0011 | 106.9 | 13.3 | 0.002 | 34.6 | 31.1 | 3.73 | 3.83 | 105.6 |
| 25.0 | 180 | 0.0013 | 106.7 | 14.1 | 0.002 | 35.5 | 28.6 | 3.30 | 3.68 | 108.1 |
| 40.0 | 220 | 0.029 | 117.3 | 15.0 | 0.003 | 37.8 | 22.1 | 2.87 | 3.55 | 120.4 |

Thus, it has been found that in an embodiment of the present invention using the oxidative leach process in combination with the aforesaid copper precipitation step, the oxidation leach can be carried out to give a Ni-Co liquor with a reasonably high copper level in order to produce a copper sulfate hydrate leach residue with better Cu:Ni and Cu:Co ratios. Thereafter, during the copper precipitation step the copper can be substantially removed allowing a significant part of nickel and cobalt to be extracted directly into the liquor. TABLE IV shows, for instance, direct extractions of nickel and cobalt were from about 14% to about 36% and from about 25% to about 33%, respectively.

The data of this example also show the change of the chemical composition of a matte in terms of the (Ni+-

Co):Cu ratio in the solids. A decrease of this ratio during the copper precipitation step means that when the autoclave leach is conducted using the matte after it has been put through the copper precipitation step and maintaining some given copper level in the final nickel-cobalt leach liquor, then, due to the depletion of the solids in respect to the above ratio, the final nickel-cobalt leach liquor will have a lower (Ni+Co):Cu ratio. Consequently, the copper sulfate hydrate leach residue will have higher Cu:Ni and Cu:Co ratios. In other words, the selectivity of the overall process is further improved.

An alternative way of copper precipitation consists of using a lesser amount of matte in conjunction with a recirculation of the solids. In this way only some part of the matte is employed prior to its oxidative leach and a part of the solids after the copper precipitation is recycled back to the same operation while another part is directed to the oxidative leach along with the rest of the matte.

The recycled solids was found to promote an increase in the pH level of the liquor being treated and, thereby, to shorten the time to achieve the aforementioned pH level necessary to keep the liquor at low iron concentration. This alternative can be used when slightly higher copper construction in the pure Ni-Co liquor can be tolerated, e.g. up to 30-50 mg/l, and lower iron concentration is desirable, e.g. up to 1 mg/l.

The rate of copper and iron precipitation from the liquor can be increased by using, instead of or in addition to air, $O_2$, $H_2O_2$ and some pH raising agent, such as hydroxide of barium, nickel or cobalt, which will not bring any impurities into the solution.

In either copper precipitating method shown above, the resultant purified Ni-Co liquor contains up to 100-130 g/l nickel and/or cobalt and negligible concentrations of iron and copper, and has a pH of about 5.0-5.5.

At this point, all of the copper of the matte is concentrated in the copper sulfate hydrate residue together with about 2-10% of nickel and/or cobalt values of the matte and with all the iron as well as with practically all the precious metal values, if any, in the matte.

Example 7 illustrates methods for effecting selective copper recovery from the autoclave leach residue.

EXAMPLE 7

A residue from autoclave leaching of a matte residue from the copper precipitation step having the following composition (%):

| Cu | Ni | Co | Fe | S |
|---|---|---|---|---|
| 45.2 | 3.72 | 0.48 | 4.62 | 9.11 | was leached at a temperature of 50°-60° C. in three solutions: $H_2SO_4$, $NH_3 + (NH_4)_2CO_3$ and $NH_3 + (NH_4)_2SO_4$. Ammoniacal solutions contained about 83-85 g/l $NH_3$ and about 156 g/l $(NH_4)_2CO_3$ or about 240 g/l $(NH_4)_2SO_4$. The slurry density corresponded to about 10-12% solids and the duration of the leaches did not exceed 2 hours. Results are tabulated in TABLE V.

TABLE V

| Leachant | Recovery into Solution (w/o) | | | | Residue Analysis (w/o) | | | |
|---|---|---|---|---|---|---|---|---|
| | Cu | Ni | Co | Fe | Cu | Ni | Co | Fe |
| $H_2SO_4$ at pH ≈ 2.2 | 95.3 | 93.7 | 85.3 | 18.7 | 18.5 | 2.13 | 0.46 | 36.6 |
| $NH_3 +$ $(NH_4)_2CO_3$ | 94.5 | 86.7 | 74.0 | — | 22.5 | 3.58 | 0.92 | 31.3 |
| $NH_3 +$ $(NH_4)_2SO_4$ | 93.1 | 88.9 | 83.4 | — | 21.8 | 3.24 | 0.64 | 33.5 |

TABLE V shows that 93-95% copper dissolution was achieved. The residual 5-7% of the copper was not dissolved mainly due to partially incomplete oxidation of copper sulfide during the autoclave oxidative leach from which the above leach residue was obtained. Indeed, copper sulfide, CuS, appeared to be a major crystalline phase in the residues after leaching. It is, therefore, understood that the copper recovery into solutions would have been even higher with complete oxidation.

As far as Ni and Co are concerned, it must be appreciated that their overall extractions into the pure NiCo liquor during the copper precipitation step and the subsequent autoclave oxidative leach were 93.0% and 93.4%, respectively. This means that only 7% of the nickel and 6.6% of the cobalt values in the matte reported to the residue from autoclaving leaching. Out of these values, from 86.7% to 93.7% of the nickel and from 74% to 85.3% of the cobalt were recovered into solutions along with copper so that the final residues contained only from 0.44% to 0.93% and from 1.7% to 0.97% of the initial nickel and cobalt values of the matte respectively. In order to completely recover all of the undissolved copper, nickel and cobalt values, these residues after the atmospheric leach can be directed to a pyrometallurgical operation for obtaining a matte, e.g. to smelting or converting as described earlier.

In a preferred embodiment of the invention, the copper sulfate hydrate leach residue is treated at a controlled pH to selectively solubilize copper, nickel and/or cobalt, as illustrated in Example 8.

EXAMPLE 8

A residue after the autoclave oxidative leach of a matte having the following composition (%):

| Cu | Ni | Co | Fe | S |
|---|---|---|---|---|
| 39.3 | 5.76 | 0.77 | 7.59 | 8.23 | was slurried in water at a liquid to solid ratio of about 1.7:1 and then leached at 50° C. for about 1 hour with a spent electrolyte containing 39 g/l copper, 24.5 g/l nickel and 144 g/l free sulfuric acid. The spent electrolyte was rapidly added until pH=2.2 was reached. The acid uptake was almost complete in about 20 minutes after which only small amounts of the electrolyte were needed to maintain the pH at the desired level of 2.2. A liquid:solid separation a pregnant solution was obtained with 96.0 g/l copper, 25.0 g/l nickel, 1.48 g/l cobalt and 0.72 g/l iron. Extractions from the residue into the pregnant solution for copper, nickel, cobalt and iron were 98.4, 93.9, 95.9 and 3.9% respectively. Overall ratio of sulfuric acid consumed to the metals dissolved was 0.66 on a molar basis, that is, practically stoichiometric. Output of a residue after the treatment was 13.8% by weight of the autoclave leach residue and its composition was as follows (%):

| Cu | Ni | Co | Fe | S |
|---|---|---|---|---|
| 4.44 | 2.55 | 0.23 | 52.9 | 3.31 | this iron-rich residue can be reverted to a pyrometallurgical operation, discarded or even treated for the recovery of precious metals if any are present in the initial matte.

If the pH is allowed to drop below 2.0, preferably 2.2, during the above atmospheric leach, then too much iron is extracted into the pregnant solution without any benefit with respect to the nonferrous metals. On the other hand, the pH must be kept below 2.8, preferably, below 2.5 because otherwise the nonferrous metals dissolution is slow and incomplete.

If lower iron extraction into the pregnant solution is desired then small amounts of the autoclave leach residue can be added in order to raise the pH up to about 2.5-2.8 prior to separating the pregnant solution from the iron-rich residue. This helps in keeping iron concentration of the pregnant solution as low as necessary to permit high current efficiency during copper electrowinning.

Although the present invention has been mainly described in conjunction with preferred embodiments, it is to be understood that modifications and variations may be resorted to without departing from the spirit and scope of the invention, as those skilled in the art will readily understand. Such modifications and variations are considered to be within the preview and scope of the invention and appended claims.

What is claimed is:

1. A process for treating a finely ground matte containing copper and sulfur values and at least one of the metal values nickel and cobalt, and which may also contain iron values, to effect selective extraction of nickel and/or cobalt from copper and, if present, iron values, comprising: forming an aqueous slurry comprising ground matte, said slurry having a sulfur content, apart from elemental sulfur, substantially equivalent on a molar basis to the nickel and cobalt plus about 35% to about 70% of the copper in said slurry; subjecting said slurry to a single stage oxidative pressure leach in a continuous manner in the presence of copper in the aqueous phase of the slurry for a period of time necessary to convert substantially all of the sulfidic sulfur in the slurry to the sulfate form, and allowing the pH of the slurry to drop to a level of below about 4 but not below about 3; separating the leach liquor from the leach residue; and thereby obtaining a leach liquor containing a preponderant amount of the nickel and cobalt values and a minor amount of the copper values and a copper sulfate hydrate containing leach residue containing a preponderant amount of the copper and substantially all the iron values.

2. A process of claim 1, wherein the oxidative pressure leach is carried out at elevated temperature up to about 130° C.

3. A process of claim 1, wherein the oxidative pressure leach is carried out at temperatures in the range of about 110° C. up to about 130° C.

4. A process of claim 1, wherein the oxygen partial pressure of the oxidative pressure leach is at least about 0.25 MPa.

5. A process of claim 4, wherein the oxygen partial pressure is about 0.5 to about 1.5 MPa.

6. A process of claim 1, wherein the copper level in the aqueous phase of the slurry is at least about 0.5 gram per liter.

7. A process of claim 6, wherein the copper level is at least about 1 gram per liter.

8. A process according to claim 1, wherein the leach liquor is treated with ground matte under oxidizing conditions to effect precipitation of copper from the liquor.

9. A process according to claim 8, wherein said liquor is treated with ground matte at a temperature of about 60° C. to about 85° C. at atmospheric pressure.

10. A process according to claim 8, wherein the residual matte obtained after treatment of the leach liquor is recirculated and forms at least a part of the matte which is subjected to the oxidative pressure leach.

11. A process according to claim 1, wherein the leach residue is treated in a copper-containing solution at a controlled pH of about 2.0 to about 2.8 and at a temperature below the boiling point to solubilize selectively nonferrous metals and to separate them from the undissolved iron in said residue.

12. A process according to claim 11, wherein the pH is about 2.2 to about 2.5.

13. A process according to claim 1, wherein copper in said leach residue is solubilized to form a copper-containing solution and copper is recovered by a method comprising electrowinning of copper.

14. A process according to claim 13, wherein at least a part of the spent electrolyte is circulated back to the oxidative leach slurry to adjust the sulfur content of the slurry.

15. A process according to claim 13, wherein at least a part of the spent solution of the electrowinning step is used as at least part of the leachant of the autoclave leach residue.

16. A process according to claim 1, wherein the conversion of sulfidic sulfur in the slurry to sulfate form is at least about 92%.

17. A process for treating a finely ground matte containing copper and sulfur values and at least one of the metal values nickel and cobalt, and which may also contain iron values, to effect separation of nickel and/or cobalt from copper, if present, iron values, comprising: forming an aqueous slurry comprising ground matte, said slurry having a sulfur content, apart from elemental sulfur, equivalent on a molar basis to the nickel and cobalt plus about 35% to about 70% of the copper in said slurry; subjecting said slurry to a single stage oxidative pressure leach in a continuous manner at an elevated temperature up to about 130° C. and a pressure of at least about 0.25 MPa in the presence of at least about 0.5 gram per liter of copper in the aqueous phase of the slurry for a period of time necessary to convert substantially all the sulfidic sulfur in the slurry to the sulfate form and allowing the pH of the slurry to drop to a level of below about 4 but not less than about 3, separating the leach liquor from the leach residue, and thereby obtaining a leach liquor containing a preponderant amount of the nickel and cobalt values and a minor amount of the copper values and a copper sulfate hydrate containing leach residue containing a preponderant amount of the copper and substantially all the iron values.

18. A process according to claim 17, wherein the copper level in the leach liquor is reduced to less than about 0.01 gram per liter and at least one of the metals nickel or cobalt is recovered from the copper depleted solution.

19. A process according to claim 17, wherein copper is extracted from the leach residue.

20. A process according to claim 19, wherein the copper is extracted by forming a copper-containing solution and copper is electrowon from such solution.

21. A process for treating a finely ground matte containing copper and sulfur values and at least one of the metal values nickel and cobalt, and which may also contain iron values, to effect separation of nickel and/or cobalt from copper and, if present, iron values, comprising: forming an aqueous slurry comprising ground matte, said slurry having a sulfur content, apart from elemental sulfur, equivalent on a molar basis to the nickel and cobalt plus about 35% to about 70% of the copper in said slurry; subjecting said slurry to a single stage oxidative pressure leach in a continuous manner at an elevated temperature up to about 130° C. and a pressure of at least about 0.25 MPa in the presence of at least about 0.5 gram per liter of copper in the aqueous phase of the slurry for a period of time necessary to convert substantially all the sulfidic sulfur in the slurry to the sulfate form and allowing the pH of the slurry to drop to a level of below about 4 but not less than about 3; separating the leach liquor from the leach residue, and thereby obtaining a leach liquor containing a preponderant amount of the nickel and cobalt values and a minor amount of the copper values and a copper sulfate hydrate containing leach residue containing a preponderant amount of the copper and substantially all the iron values; treating the leach liquor with ground fresh matte under oxidizing conditions at a temperature of about 60° C. to about 85° C. to precipitate copper from the leach liquor; separating the copper-depleted leach liquor from the solids containing the precipitated copper, and recovering at least one of the metals nickel or cobalt from the copper-depleted leach liquor.

22. A process according to claim 21, wherein the solids containing precipitated copper comprises at least a part of the slurry which is subjected to the oxidative pressure leach.

23. A process according to claim 21, wherein the leach residue is treated in a copper-containing leach solution at a controlled pH of about 2.0 to about 2.8 and at a temperature below the boiling point to solubilize selectively nonferrous metals.

24. A process according to claim 23, wherein copper is recovered from the resultant solution by means of an electrowinning method.

* * * * *